UNITED STATES PATENT OFFICE.

WILHELM HICKMANN, OF FRANKFORT-ON-THE-MAIN, GERMANY, ASSIGNOR TO CHEMISCHE FABRIK GRIESHEIM-ELEKTRON, OF FRANKFORT-ON-THE-MAIN, GERMANY, A CORPORATION OF GERMANY.

PROCESS OF REGENERATING THE WASTE PRODUCTS OF GALVANIC BATTERIES.

1,192,061.  Specification of Letters Patent.  Patented July 25, 1916.

No Drawing.  Application filed May 10, 1911.  Serial No. 626,218.

*To all whom it may concern:*

Be it known that I, WILHELM HICKMANN, a subject of the German Emperor, and resident of Frankfort-on-the-Main, Germany, have invented certain new and useful Improvements in Processes of Regenerating the Waste Products of Galvanic Batteries, of which the following is a specification.

My invention relates to a process of regenerating the waste products or materials of galvanic batteries and more particularly the waste products of batteries of the Leclanche type. As is well known in the art, such batteries have been extensively used but the exhausted elements, apart from their metallic constituents have simply been thrown away and have not been regenerated and rendered again fit for use. This waste entails a great loss every year and adds greatly to the cost of such cells or batteries. The high cost of the materials furthermore prohibits their use for purposes in which a large number and high efficiencies are required, as, for instance, for lighting purposes.

The invention, therefore, has for one of its objects to regenerate at a low cost the constituent parts of the exhausted cells or batteries whereby material which has heretofore been wasted is again rendered capable of use. The lowering of the cost of the materials will also tend to increase their extensive employment for lighting installations and for purposes where a permanent output is required where, on account of their high cost they could not hitherto be used.

It was natural to suppose that the exhausted elements of the cells or batteries could be regenerated by treatment with the oxygen of the air, as is done in the Weldon process. However, this presumption has proved to be erroneous. The spent depolarizer in the condition in which it comes from the exhausted cells, is not susceptible of direct oxidation. Furthermore oxidation by means of other oxidizing agents is difficult, inasmuch as an absorption of oxygen does not take place at all or only imperfectly and even then only by the use of a large amount of oxidizing agent.

I have found that the conditions for the oxidation process can be considerably improved if the process be combined with the regeneration of the spent electrolyte whereby moreover the advantage is obtained that the regenerated electrolyte can be used again.

For the purposes of explanation I will presume that I have to deal with zinc-carbon electrodes and an electrolyte of sal ammoniac or ammonium chlorid and zinc chlorid, the carbon electrode being surrounded by the usual depolarizer consisting of graphite or coal-dust and manganese dioxid or any other manganese compound which acts in a similar way for instance, hydrated manganese dioxid or salts of the latter. After the cell is spent a portion of the manganese compound has been reduced to lower states of oxidation of the manganese and, in addition to ammonia, difficultly soluble bases and basic salts have been found.

The following will illustrate how the process according to this invention may be carried out in practice. The spent mass may be decomposed into separate components by a systematic lixiviation with water and a suitable dilute acid, for instance hydrochloric acid. The first part of the lixiviation occurs according to the formulas, $$NH_4OH + HCl = NH_4Cl + H_2O$$

and $$Zn(OH)_2 + 2HCl = ZnCl_2 + 2H_2O,$$

whereupon the further reaction follows according to the formula, $$MnO, MnO_2 + 2HCl = MnCl_2 + H_2O, MnO_2 \text{ or } H_2MnO_3 \text{ or } MnO_2, H_2O.$$

Obviously any substance containing chlorin in the negative radical thereof or which will produce free chlorin ions in an aqueous solution may be used, such as an aqueous solution of chlorin gas, $HOO_1$, etc. It has been found that it is possible in this manner to separate the drawn-off liquors into two portions, one portion free from manganese and the other portion containing manganese. If the electrolyte consists, as in the present example, of sal ammoniac and zinc chlorid, the first portions of the lixiviation contain only these two compounds, whereas the later portions contain mainly manganous chlorid along with a little zinc chlorid. This separation has the advantage that the first portion may be used directly as an electrolyte, while the portion last obtained may be treated in various ways to produce a depolarizer fit for use. The chlorid of manganese formed as above, is converted into hydrated peroxid of manganese, by oxidation with a suitable oxidizing agent such as permanganate, for instance, and an acid salt of manganese is thereby obtained which is eminently suitable for use as a depolarizer. The same is obtained according to the following reaction:

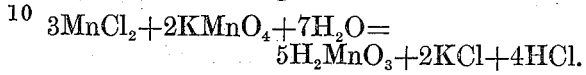

The $H_2MnO_3$ can readily be converted into an acid manganate, in the presence of salts.

If in the element, pyrolusite was originally used as depolarizer, and if the regenerated substance be used to make up new cells, or batteries, these, under the same conditions of working, give more than double the efficiency of the original materials. The regeneration process therefore results in not only a cheapening of the depolarizer, but also its refinement and improvement whereby the economical value of this invention is greatly enhanced.

It is to be understood that the expression "galvanic cell of the Leclanche type" refers to any of those cells which employ zinc and carbon as the elements thereof and utilize a compound of manganese as a depolarizer, and is not intended to restrict the invention to use on the original Leclanche cell. Such improvements, for instance, as that covered by the new depolarizer disclosed in my co-pending application Serial No. 626,217, filed May 10, 1911, are also intended to be included, as far as they relate to use in the Leclanche cell.

I claim herein as my invention:

1. A process for treating the spent electrolyte and depolarizing mass of a galvanic cell of the Leclanche type which includes the addition thereto of a substance containing chlorin in the negative radical thereof and a suitable oxidizing agent.

2. The process of regenerating the spent electrolyte and depolarizing mass of a galvanic cell of the Leclanche type which comprises separating the electrolyte components from the whole mass by lixiviation with a substance producing free chlorin ions in aqueous solution, treating the remaining portion with acid whereby a manganese salt is brought into solution, and then subjecting to the action of a suitable oxidizing agent the manganese salt brought into solution.

3. The process of regenerating the spent electrolyte and depolarizing mass of a galvanic cell of the Leclanche type which comprises separating the electrolyte components from the whole mass by lixiviation with dilute hydrochloric acid, then treating the remaining portion with dilute hydrochloric acid, and then subjecting to the action of an oxidizing means the manganese salt which has been brought into solution in this manner.

4. The process of regenerating the spent electrolyte and depolarizing mass of a galvanic cell of the Leclanche type which comprises separating the electrolyte components from the whole mass by lixiviation with dilute hydrochloric acid, then treating the remaining portion with dilute hydrochloric acid, and then oxidizing with permanganate the manganese salt brought into solution in this manner.

5. The process of regenerating the spent electrolyte and depolarizing mass of a galvanic cell of the Leclanche type which comprises separating the electrolyte components from the whole mass by lixiviation with a substance producing free chlorin ions in an aqueous solution, then treating the remaining portion with a substance producing free chlorin ions in an aqueous solution, and then oxidizing with permanganate the manganese salt brought into solution in this manner.

6. The hereindescribed process of regenerating the spent electrolyte and depolarizing mass of a galvanic cell which comprises treating the mass with a substance producing free chlorin ions in an aqueous solution, and subjecting a part of the treated portion to the action of a suitable oxidizing agent, substantially as and for the purpose set forth.

In testimony whereof I have signed my name to this specification in the presence of two subscribing witnesses.

WILHELM HICKMANN.

Witnesses:
 FRANZ HASSLACHER,
 MICHAEL VOLK.